3,813,297
PROCESS FOR MAKING POTATO STARCH WITHOUT WASTE
Roy L. Shaw, Jr., East Grand Forks, Minn., assignor to the United States of America as represented by the Secretary of Agriculture
No Drawing. Filed June 7, 1972, Ser. No. 260,570
Int. Cl. C13l 1/02
U.S. Cl. 127—66                            6 Claims

ABSTRACT OF THE DISCLOSURE

High quality potato starch is produced by fine grinding and air classifying cut and dehydrated potatoes to obtain a starch-enriched fraction and a protein-enriched fraction. The starch-enriched fraction is water washed in counter current fashion to remove protein, sugars, amino and other organic acids and obtain a high quality potato starch contaning less than 1.0% protein. The protein-enriched fraction from the air classification step is combined with the water from the counter current washing step to obtain, when dried, a product having a protein content of about 20 to 30%. This relatively high protein product is useful as a high quality animal feed supplement.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of potato starch and more particularly it relates to the production of potato starch with a concomittant elimination of the waste problem and a substantial reduction in the mount of water needed in the process.

Potato starch is traditionally produced by wet-milling which requires large amounts of water to separate proteins, pulp and other materials from the product. It has been reported that, in a plant that utilizes 250 tons per day, the waste water was 800 gallons per ton, excluding water for washing potatoes (J. Water Pollution Control Federation 40, 214, 1968). In a modern plant in Europe with the newest processing equipment it was predicted that 792 gallons per metric ton would be needed (Die Stärke 22, 27, 1970). Disposal of such a large amount of waste water poses a serious problem because both Federal and State laws prohibit disposal into water courses and disposal through municipal sewage systems is prohibitively expensive.

It is an object of this invention to provide a method of producing potato starch that eliminates the waste problem.

Another object of this invention is to provide a method of producing potato starch that substantially reduces the amount of water needed in the process.

In general, according to this invention the above objects are accomplished by fine grinding and air classifying cut and dehydrated potatoes to obtain a starch-enriched fraction and a protein-enriched fraction, washing the starch-enriched fraction in a counter current fashion to remove the remaining protein, sugars, amino and other organic acids and obtain the desired potato starch. Counter current washing minimizes the amount of water need in this part of the process. In fact, it requires only about 10% of the amount of water needed in a conventional starch plant. In addition, this wash water is combined with the protein-enriched fraction from the air classification step and dried to yield a product containing about 25 to 30% protein. This product is an excellent animal feed supplement. Thus, there is no waste effluent to discard and the amount of saleable product from the original potatoes is greatly increased.

The process consists essentially of the following four steps:

1. Cutting and dehydrating potatoes in such a manner that heat damage of the starch is prevented. Since heat damage is directly related to moisture content, temperature and duration of exposure, a satisfactory product can be obtained by use of a number of cutting and drying conditions;
2. Fine grinding the cut and dried potatoes in a pin or other impact type mill;
3. Air classifying the fine ground material from step 2 to obtain a starch-enriched fraction and protein-enriched fraction;
4. Washing the starch-enriched fraction in a counter current fashion to remove protein, sugars and amino and other organic acids to obtain the desired starch product; and
5. Combining the protein-enriched fraction from step 3 with the wash water from the counter current washing operation of step 4 and drying the combined material to obtain a relatively high protein (20 to 30%) product.

Sieving the ground potatoes through selected screens is sometimes beneficial when used in conjunction with the air classification of step 3. This is especially useful when the material contains many coarse fragments. The counter current washing of step 4 is a standard washing procedure used in the food processing and chemical industries and is well known to anyone skilled in this art.

The process of this invention is exemplified as follows:

EXAMPLE 1

Potatoes were dried at 85° C., coarse ground at 9000 r.p.m. in a pin mill and air classified in a commercial air classifier at a feed gate setting of 15 and a fin setting of 10°. The starch and protein fractions represented 91.2% and 8.8%, respectively of the recovered material. The starch fraction was fine ground at 19,000 r.p.m. in a pin mill and air classified at the same settings as before to obtain a starch fraction and a protein fraction that represented 95.8% and 4.2%, respectively, of the recovered material. The starch fraction had a protein content of 6.3% which was reduced to about 0.5% by the counter current washing procedure to obtain a high quality potato starch. The wash water was combined with the protein fractions from the air classification steps and dried to obtain a product containing about 25% protein.

EXAMPLE 2

Potatoes were dried at 60° C., cut into small pieces and then fine ground at 14,000 r.p.m. in a pin mill. The fine ground potatoes were then separated into two fractions by sieving over a 125 micron screen. The material that remained on the screen was principally coarse, brown peel fragments. The material that passed through the screen was air classified at a feed gate setting of 15 and a pin setting of 25° to obtain a starch fraction and a protein fraction. The starch fraction was reground in a pin mill at 19,000 r.p.m. and air classified at the same feed gate and pin settings. The resulting starch fraction was 85% of the recovered material. However, the sieving to remove the coarse, brown peel and fibre fragments before classification had a beneficial effect because the protein content of the starch fraction had been significantly lowered to 4.0%. This protein content was further lowered to about 0.3% by counter current water washing. The combined wash water, protein fractions from the air classification steps, and material removed by sieving were concentrated to a product containing 28.5% protein.

EXAMPLE 3

Potatoes were dried at 60° C., fine ground at 19,000 r.p.m. in a pin mill, and sieved through an 88 micron screen to remove brown particles. The material that passed through the screen was air classified and the resulting starch fraction reclassified until 10 to 15% of the stream was removed as protein fraction. More brown and inadequately ground particles were removed from the starch fraction by sieving through 53 micron and 53/44 micron screens. The material sieved through the 44 micron screen was washed with water in a counter current manner and dried. The starch product represented 70% of the total recovered material and contained only about 0.4% protein. The combined wash water from the counter current washing operation and separated non-starch material from air classification and screening steps contained from 10 to 11% solids. This represents a tenfold concentration over normal waste effluent of a conventional wet milling potato starch plant, and thus a 90% reduction in volume of effluent.

Other experimental work showed that neither moisture content of up to at least 11.0% nor drying temperature affected the air classification of the potatoes.

I claim:

1. A process for producing high quality potato starch with a concomitant conservation of water and elimination of waste, comprising the steps of:
   (a) cutting potatoes into small pieces and dehydrating the pieces at a temperature of from about 60 to 85° C.;
   (b) fine grinding the cut and dried potato pieces at between 9,000 and 19,000 r.p.m. in an impact type mill;
   (c) separating the fine ground material from step (b) into a starch-enriched fraction and a protein-enriched fraction;
   (d) washing the starch-enriched fraction with water in a counter current manner to conserve water and to reduce the residual protein, sugars, amino and other organic acids in the fraction to less than 0.5% and thereby obtaining a high quality potato starch;
   (e) combining the protein-enriched fraction from step (c) with the wash water from step (d); and
   (f) drying the combined materials of step (e) thus eliminating waste and obtaining a product containing from 20 to 30% protein.

2. The process of claim 1 wherein the fine ground material is separated into a starch-enriched fraction and a protein-enriched fraction by air classification.

3. The process of claim 1 wherein the fine ground material is separated into a starch-enriched fraction and a protein-enriched fraction by a combination of sieving and air classification.

4. The process of claim 3 wherein the feed gate setting and the fin setting of the air classifier are 15 and from 10 to 25, respectively.

5. A process for conserving water and eliminating waste in the production of high quality potato starch, comprising the steps of:
   (a) cutting potatoes into small pieces and dehydrating the pieces at a temperature of from about 60 to 85° C.;
   (b) fine grinding the cut and dried potato pieces at between 9,000 and 19,000 r.p.m. in an impact type mill;
   (c) air-classifying the fine ground material from step (b) into a starch-enriched fraction and a protein-enriched fraction;
   (d) conserving water by water washing the starch-enriched fraction in a counter current manner to reduce the residual components other than starch in the fraction to less than 0.5% and thereby obtaining a high quality potato starch; and
   (e) eliminating waste and its concomitant environmental polluting effects by combining the protein-enriched fraction from step (c) with the wash water from step (d) and drying the combined materials to obtain a product containing from 20 to 30% protein.

6. In a process for producing high quality potato starch wherein cut and dehydrated potatoes are fine ground, the fine ground material is separated into a starch-enriched fraction and a protein-enriched fraction, and the starch-enriched portion is washed to reduce the residual protein, sugars, amino acids and other organic acids in the fraction to less than 0.5%, the improvement comprising the steps of:
   (a) water washing the starch-enriched fraction in a counter current manner thus conserving water;
   (b) combining the protein-enriched fraction with the wash water from step (a); and
   (c) drying the combined materials of step (b) thus eliminating waste and its concomitant environmental polluting effects and obtaining a product containing from 20 to 30% protein that is usable as an animal feed supplement.

References Cited

UNITED STATES PATENTS

| | | | |
|---|---|---|---|
| 2,987,424 | 6/1961 | Olnick | 127—67 |
| 3,077,408 | 2/1963 | Rozsa | 127—67 X |
| 3,661,593 | 5/1972 | Christianson | 127—67 X |
| 3,079,283 | 2/1963 | Dreissen | 127—67 |
| 3,736,182 | 5/1973 | Wright | 127—67 X |
| 2,744,014 | 5/1956 | Greathouse | 127—66 X |
| 2,798,011 | 7/1957 | Fontein | 127—66 |
| 3,433,668 | 3/1969 | Hein | 127—66 X |

MORRIS O. WOLK, Primary Examiner

S. MARANTZ, Assistant Examiner

U.S. Cl. X.R.

127—67, 69; 426—807